United States Patent [19]

Hardenberg et al.

[11] 4,411,243
[45] Oct. 25, 1983

[54] EXTERNALLY OPERATED INTERNAL COMBUSTION ENGINE

[75] Inventors: Horst Hardenberg, Stuttgart; Horst Bergmann, Esslingen, both of Fed. Rep. of Germany

[73] Assignee: Daimler-Benz AG, Fed. Rep. of Germany

[21] Appl. No.: 237,901

[22] Filed: Feb. 25, 1981

[30] Foreign Application Priority Data

Feb. 29, 1980 [DE] Fed. Rep. of Germany ....... 3007664

[51] Int. Cl.$^3$ ................................................ F02B 7/02
[52] U.S. Cl. .................................... 123/577; 123/525; 123/557; 123/431
[58] Field of Search ............... 123/557, 525, 527, 577, 123/575, 27 GE, 431

[56] References Cited

U.S. PATENT DOCUMENTS

| | | | |
|---|---|---|---|
| 2,444,665 | 7/1948 | Oberbeck et al. | 123/575 |
| 2,534,346 | 12/1950 | Fenney | 123/431 |
| 3,406,666 | 10/1968 | Steiger | 123/525 |
| 3,753,424 | 8/1973 | Haidvogel | 123/27 GE |
| 4,015,569 | 4/1977 | Leshner | 123/431 |
| 4,111,161 | 9/1978 | Ueno et al. | 123/527 |

FOREIGN PATENT DOCUMENTS

747576 6/1933 France .............................. 123/557

OTHER PUBLICATIONS

1981, Society of Automotive Engineering, Inc., "Diesel Alcohol Injection Studied", p. 50.

*Primary Examiner*—Charles J. Myhre
*Assistant Examiner*—E. Rollins Cross
*Attorney, Agent, or Firm*—Craig & Burns

[57] ABSTRACT

An externally ignited internal combustion engine, operable by a homogeneous fuel, wherein liquid fuel is completely vaporized and at an approximately relatively lean proportion is mixed with air to provide for quantity control of the fuel-air mixture. The quantity control remains limited to a lower part throttle or partial load range and above such range, fuel in a liquid condition is injected into the combustion chamber of the internal combustion engine to enable a quality control over the fuel mixture. The injection of the fuel is carried out so that the injected jet of fuel does not contact the relatively cold wall parts of combustion chambers of the respective cylinders of the internal combustion engine.

7 Claims, 1 Drawing Figure

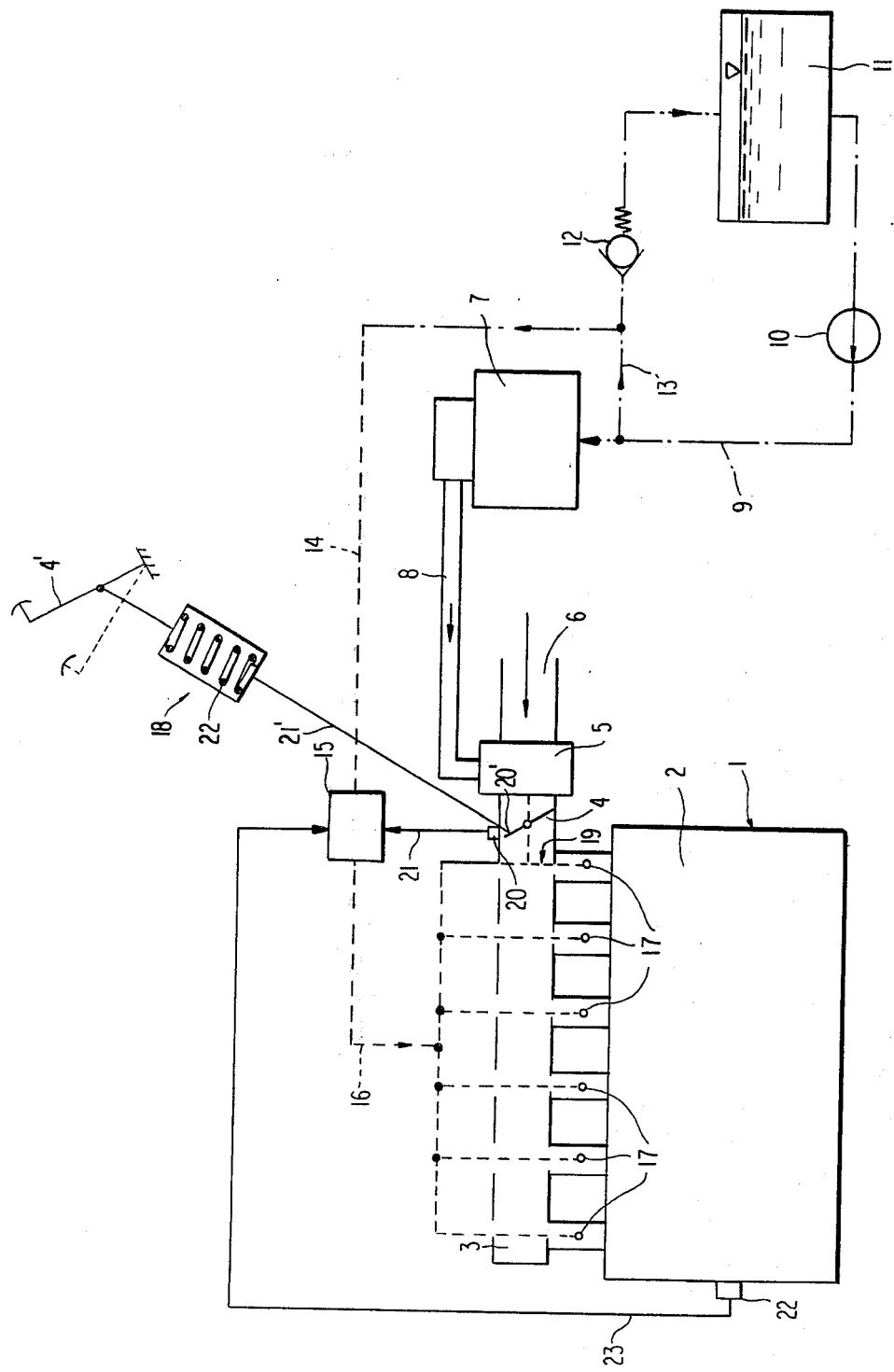

EXTERNALLY OPERATED INTERNAL COMBUSTION ENGINE

The present invention relates to an externally ignited internal combustion engine. The engine is operated by a homogeneous gas mixture, wherein a liquid fuel, completely gasified or vaporized is mixed with combustion air in an approximately constant, relatively lean mixture proportion. This provides a quantity control of the homogeneous fuel mixture supplied to the internal combustion engine.

With gasoline-operated internal combustion engines, when a maximum output is approached, the engine is operating with a fuel-air mixture having an air deficiency, i.e., a lean mixture. Therefore, in all internal combustion engines of this type, in a full load or full throttle operating range, the fuel mixture is slightly enriched in order to increase the output of the engine as compared to a partial load operational range thereof. Additionally, for accelerating operations, so-called full throttle enriching systems are utilized with the enriching system being operable over a short period of time.

For stationary operational conditions of an internal combustion engine, it is possible to adjust the mixture treatment of the fuel-air mixture at the carburetor so that over a large operational range, a relatively lean mixture can be used. This results in an advantageous consumption of fuel and a minimal emission of pollutants in the exhaust gases in the operational range.

However, in all other operational conditions of the internal combustion engine such as, for example, starting up engine, warming up engine, acceleration and full throttle positions, additional systems have been proposed. Examples of such systems include the direct injection into the intake pipe or manifold by means of which, in each case, through a corresponding enrichment of the air-fuel mixture, a satisfactory operation of the vehicle in which the engine is disposed is ensured. However, a considerable disadvantage of the fuel enriching is that the fuel consumption is increased and the emission of pollutants in the exhaust gases becomes considerably greater.

With an internal combustion engine driven by a homogeneous gas, vaporized or gaseous fuel reaches the cylinders through a gas-air mixture. Due to the fine distribution of the gas molecules, the mixture is easy to ignite so that the mixture can be much leaner without the occurrence of misfiring of the engine.

For example, the proportion and volume of gaseous fuel in the fuel-mixture may be large and, additionally, the heating values of, for example, alcohol in the fuel are lower than those used in the customary fuels. Therefore, the output of the engine per liter of fuel utilizing alcohol in comparison to internal combustion engines operated with gasoline is considerably lower. Thus, for example, for the same output of the engine, about 1.5 to 2 times the fuel volume is required when the engine is operated with a fuel mixture utilizing alcohol.

The aim underlying the present invention essentially resides in providing an externally ignited internal combustion engine and a method of operating the same wherein the efficiency of the internal combustion engine, when operated with a homogeneous gas (alcohol) achieves a higher output per liter of fuel.

According to advantageous features of the present invention, a control of the quality of the fuel mixture fed to the internal combustion engine is limited to a lower partial throttle or partial load range of the engine. About such range, fuel, in a liquid condition, is brought into the combustion chambers of the respective cylinders of the engine to provide a quality control of the fuel in the upper or full load range of the engine. Advantageously, the liquid fuel is directed into the combustion chambers of the respective cylinders so that a jet of the injected fuel does not contact the relatively cold walls of the combustion chamber.

In accordance with the present invention, purely vaporized or gaseous fuel is supplied to the internal combustion engine up to about 60% of the maximum output or full load range of the engine.

In accordance with advantageous features of the present invention, a separately heated evaporator means is provided for the fuel, with an air/gas mixer means being provided for producing an air/gas mixture with an approximately constant composition. A throttle valve for a range dependent control of the supplied volume of the fuel is arranged in an intake connection which communicates with an intake or suction manifold that branches out to the individual combustion chambers of the internal combustion engine. An inlet valve means is provided for each of the combustion chamber means with the inlet valve means being opened in a timed manner. A throttle lever in the form of, for example, an accelerator or gas pedal is at least indirectly coupled with the throttle valve. The coupling is accomplished so that the throttle valve is already in a fully opened position in a partial load range of the engine and remains in such position when the throttle lever is moved further. One injection valve is associated with each of the combustion chambers. The injection valves provide direct injection of the liquid fuel in the proximity of each of the inlet valves. A common fuel supply line leads to the injection valves with a control valve provided for controlling the flow of liquid fuel through the supply line to the injection valves. The control valve is at least indirectly coupled with the throttle lever, with the control valve being adapted to provide for a load range and/or a rotational speed dependent adjustment of the fuel supply to enable a feeding of a larger fuel volume to the engine.

In the area of quantity control, namely, in the lower partial throttle or partial load range of the engine, the engine may be operated with a very lean mixture, that is, with a high excess of air, and still operate very economically in this range. In the case of a transition to a quality control of the fuel, that is, in the upper part throttle or upper partial load range and full throttle or full load range, depending upon the throttle range, fuel in a liquid condition is brought into the combustion chamber of the internal combustion engine and is enriched more and more depending upon the specific throttle range.

Due to the addition of a liquid fuel as a supplementary fuel, there is no filling loss so that a higher output per liter may be reached than in the case of a pure gas operation of the engine.

With the use of alcohol, since the heat of vaporization of alcohol injected in the liquid condition is high, the effective final compression pressures and temperatures, with the same geometric compression ratio, are lowered as compared to pure gas operation (octane number increase) of the engine. Thus, a corresponding increase of the geometrical compression ratio may be carried out. This results, especially in the quantity control range, in a better fuel consumption and in a simultaneous increase of the efficiency of the engine in the full throttle and also part throttle operation. With a part throttle or partial load range operation, by virtue of the features of the present invention, no pinging may occur despite the existence of high compression conditions since, as is the case with lean mixtures, the danger of pinging is minimal.

Additionally, when the quality control of the fuel is utilized, in accordance with the present invention, there will also be no throttle losses. This has a favorable effect on the overall efficiency of the engine and total fuel consumption.

Because the supply is of a purely gaseous or vaporized fuel supply about 60% of the maximum output of the internal combustion engine, the control range of the throttle valve and, therefore, the throttle losses are relatively low.

With an internal combustion engine constructed in accordance with the present invention and operated by means of a homogeneous gas mixture, the efficiency and engine output per liter of fuel is improved because an injection valve for liquid fuel which injects the fuel in direct proximity of the inlet valve is provided additionally, a common or joint supply line is provided for the injection valves. This supply line is controlled by a control valve for a throttle range and/or rotational speed dependent adjustment of the corresponding volumes of fuel for the specific range and/or rotational speed of the engine.

Because liquid alcohol is injected directly into the combustion chambers of the internal combustion engine, the stroke volume of the internal combustion engine is almost completely available for air intake. Therefore, an increase of output relative to the stroke volume may be achieved which corresponds approximately to an internal combustion engine with a turbocharger, which engine is driven by means of diesel fuel.

Another advantage of the internal combustion engine in accordance with the present invention is that there is a reduction of thermal stress in the upper throttle or upper load range by virtue of the internal vaporization of the alcohol. This, among other things, also reduces the temperature level in the exhaust gases so that for critical components such as, for example, exhaust pipes or the like less complex and less expensive material may be utilized.

Accordingly, it is an object of the present invention to provide an externally ignited internal combustion engine which avoids, by simple means, shortcomings and disadvantages encountered in the prior art.

Another object of the present invention resides in providing an externally ignited internal combustion engine with a homogenous gas mixture to achieve a higher engine output per liter of fuel.

Yet another object of the present invention resides in providing an externally ignited internal combustion engine which enables a control of the volume of fuel to be fed to the engine in dependence upon a particular load range and/or rotational speed of the engine.

A still further object of the present invention resides in providing an externally ignited internal combustion engine which reduces the thermal stresses in the engine in an upper or full load range of operation of the engine.

A still further object of the present invention resides in providing an externally ignited internal combustion engine which ensures a proper functioning of the engine under all operating conditions.

These and other objects, features, and advantages of the present invention will become more apparent from the following description when taken in connection with the accompanying drawing which shows, for the purposes of illustration only, one embodiment in accordance with the present invention, and wherein:

The single FIGURE is a schematic view of an internal combustion engine operable by a homogeneous fuel mixture (alcohol) in accordance with the present invention.

Referring now to the single FIGURE of the drawing, according to this FIGURE, an internal combustion engine generally designated by the reference numeral 1 includes a cylinder block 2 with an intake manifold 3 provided which branches out to individual cylinders of the engine 1. A throttle valve 4 is disposed in the intake manifold 3 and is coupled by way of a linkage system, in a conventional manner, with a throttle lever such as an accelerator or gas pedal 4'. The intake manifold 3 is directly connected to an air/gas mixer 5, with the air/gas mixer 5 connected with a fresh air intake nipple or throat 6 and, by way of a conduit or line 8, with a fuel evaporator 7 for enabling a supplying of the fuel to the air/gas mixer 5. The evaporator 7 may be heated by an independent heating means or by way of heat supplied from the engine 1. Fuel is supplied from a fuel tank 11 through a fuel line 9 by way of a fuel pump 10. A fuel return line 13, provided with a check valve 12, branches off from the fuel line 9 to enable excess fuel supplied to the evaporator 7 to flow back into the fuel tank 11.

A branch line or conduit 14 connects the fuel return line 13 with a control valve 15, of conventional construction. The control valve 15 is adapted to control the supplying of fuel to injection valves 17 associated with each of the cylinders of the internal combustion engine.

A sensor or detector means 20, of conventional construction, senses a position of the throttle valve 4 and provides an output control signal 21 of the sensed position of the throttle valve 4 to the control valve 15. A further sensor or detector means 22, of conventional construction, senses the rotational speed of the internal combustion engine and provides an output control signal 23 to the control valve 15. The output control signals 21, 23 from the sensor means 20, 22 determine the position of the control valve 15 and thus the amount of fuel supplied to the injection valves 17 in a manner described more fully hereinbelow.

The control valve 15 is closed so that no liquid fuel is supplied to the injection valve 17 up to a throttle range of about 60%. That is, in this throttle range, the internal combustion engine 1 is exclusively controlled by the throttle valve 4 so that a fuel quantity control is provided. In a higher operating range of the engine 1, that is, above 60% to a full throttle or full load operating range, the detector means 20, 22 provide output control signals 21 and/or 23 to the control valve 15. Thus, the control valve is opened or closed to permit more or less liquid fuel to flow through the control valve 15 depending upon the detected position of the throttle valve 4 and/or rotational speed of the engine 1. The liquid fuel flows through the control valve 15 and common fuel supply pipe or line 16 to the injection valve 17. The supplied fuel is injected, as directly as possible, into the individual combustion chambers of the respective cylinders of the internal combustion engine 1 to provide a fuel quality control.

In the present invention, using a fuel-air mixture with a high leanness, for example, to about 1.8, in the lower or partial load range, is advantageous. Additionally, the extensive elimination of throttle losses in the medium and upper throttle range by using the direct injection of the fuel, in a liquid condition, from the injection valve 17 into each combustion chamber of the internal combustion engine 1 is advantageous. Specifically, a higher efficiency and a higher engine output per liter of fuel is achieved in accordance with the present invention, while the danger of knocking or pinging is eliminated as the temperature level of the exhaust gases resulting from the operation of the engine 1 is reduced.

As shown in the drawing a means are provided for connecting the throttle valve 4 with the accelerator or gas pedal 4'. This assures that the throttle valve 4 is fully opened in a partial load range of the engine 1 and remains in the fully opened position upon a further movement of the accelerator or gas pedal 4'. More particularly, an idling stop 20 and an open portion stop 19 are provided for the throttle valve 4. The throttle valve 4 is connected to the accelerator or gas pedal 4' by a linkage rod 21 with a compression member generally designated by the reference numeral 18 interposed between the throttle valve 4 and the accelerator or gas pedal 4'. The compression member 18 includes a biasing spring 22, which has a greater spring force than a release spring (not shown) of the throttle valve 4, including the normally occuring frictional forces.

Upon a depression of the accelerator or gas pedal or in a lower level operating range, the throttle valve 4 quickly reaches the open position until the valve 4 rests against the stop 19. As the accelerator or gas pedal 4' is further depressed to a full load position, the member 18 absorbs the movement of the connecting or linkage rod 21 articulated to the gas pedal or accelerator 4'.

While we have shown and described only one embodiment in accordance with the present invention, it is understood that the same is not limited thereto, but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A multicylinder internal combustion engine having at least a spark plug operable by a homogeneous fuel mixture, the engine comprising a heated evaporator means for completely vaporizing a liquid fuel, means connected with the evaporator means for producing an air/fuel mixture having an approximately constant composition, throttle valve means for providing a load range dependent control of a volume of fuel supplied to the engine, wherein means are provided for connecting the throttle valve means with a load control member of the engine so that the throttle valve means is fully opened in a partial load range of the engine and remains in the fully opened position upon a further movement of the load control member, means are provided for directly injecting liquid fuel into respective cylinders of the engine, and means are at least indirectly coupled with the load control member and liquid fuel injecting means for controlling a supply of liquid fuel to the cylinders in dependence upon at least one of a load range of the engine and a rotational speed of the engine.

2. The internal combustion engine according to claim 1, wherein the controlling means includes a control valve, a first detector means for detecting a position of the throttle valve means and for providing an output control signal to the control valve of the detected position, and a second detector means for detecting a rotational speed of the engine and for providing an output control signal to the control valve means.

3. The internal combustion engine according to one of claims 1 or 2, wherein each cylinder of the engine is provided with an inlet valve means, and the injecting means injects the liquid fuel in direct proximity to the respective inlet valve means.

4. The internal combustion engine according to claim 3, wherein a common liquid fuel supply line is provided for supplying liquid fuel to the injecting means, and said control valve is disposed in said common liquid fuel supply line.

5. The internal combustion engine according to claim 4, wherein the engine further includes an intake manifold means having a plurality of branches which extend to the respective cylinders and a fresh air inlet means, and the means for producing an air/fuel mixture is an air/fuel mixer means disposed between the intake manifold means and the fresh air inlet means.

6. The internal combustion engine according to claim 5, wherein the load control member of the engine is an accelerator.

7. The internal combustion engine according to claim 5, wherein external heating means are provided for heating the evaporator means.

* * * * *